US012053044B2

(12) United States Patent
Carey

(10) Patent No.: US 12,053,044 B2
(45) Date of Patent: Aug. 6, 2024

(54) MODULAR HEAD GARMENT

(71) Applicant: Seirus Innovative Accessories, Inc., Poway, CA (US)

(72) Inventor: Danica Brooke Carey, San Diego, CA (US)

(73) Assignee: SEIRUS INNOVATIVE ACCESSORIES, INC., Poway, CA (US)

( * ) Notice: Subject to any disclaimer, the term of this patent is extended or adjusted under 35 U.S.C. 154(b) by 194 days.

(21) Appl. No.: 17/426,945

(22) PCT Filed: Jan. 27, 2020

(86) PCT No.: PCT/US2020/015271
§ 371 (c)(1),
(2) Date: Jul. 29, 2021

(87) PCT Pub. No.: WO2020/159895
PCT Pub. Date: Aug. 6, 2020

(65) Prior Publication Data
US 2022/0095731 A1 Mar. 31, 2022

Related U.S. Application Data

(60) Provisional application No. 62/798,351, filed on Jan. 29, 2019.

(51) Int. Cl.
*A42B 1/205* (2021.01)
*A41D 13/11* (2006.01)
(Continued)

(52) U.S. Cl.
CPC .......... *A42B 1/205* (2013.01); *A41D 13/1153* (2013.01); *A41D 23/00* (2013.01);
(Continued)

(58) Field of Classification Search
CPC ........ A42B 1/225; A42B 1/046; A41D 23/00; A62B 18/086
See application file for complete search history.

(56) References Cited

U.S. PATENT DOCUMENTS 1,284,240 A * 11/1918 Close .................. A42B 1/0186 2/6.1
1,309,783 A * 7/1919 Slawin .................. A41D 13/11 2/206
(Continued)

FOREIGN PATENT DOCUMENTS

JP 2280 Z 6/1906
JP 3084601 3/2002
(Continued)

OTHER PUBLICATIONS

Seirus Innovation Magne Mask Convertible Combo Clava, Seirus Innovation, Aug. 8, 2005, https://www.amazon.com/Seirus-Innovation-Magnemask-Convertible-Neofleece/dp/B00TK51WVM/ (Year: 2005).*
(Continued)

*Primary Examiner* — Heather Mangine
(74) *Attorney, Agent, or Firm* — Procopio, Cory, Hargreaves & Savitch LLP

(57) ABSTRACT

A head garment, which may comprise a nose covering portion, a head covering portion, and/or a neck covering portion. The nose covering portion may comprise a nose bridge portion, an upper lip portion, and a throughhole The head covering portion may be affixed to the nose covering portion and positioned to, when the head garment is worn by a user, cover the user's forehead and the back of the user's head. The neck covering portion may comprise an upper edge with a fastener portion that is configured to engage with a corresponding fastener portion on the lower edge of the nose covering portion, to releasably affix the lower edge of the nose covering portion to the upper edge of the neck
(Continued)

covering portion, and disengage from the corresponding fastener portion on the lower edge of the nose covering portion, to form a mouth opening between the two edges.

10 Claims, 13 Drawing Sheets

(51) Int. Cl.

| | |
|---|---|
| ***A41D 23/00*** | (2006.01) |
| ***A42B 1/046*** | (2021.01) |
| ***A42B 1/22*** | (2006.01) |
| ***A62B 18/08*** | (2006.01) |

(52) U.S. Cl.
CPC .............. *A42B 1/046* (2013.01); *A42B 1/225* (2013.01); *A62B 18/086* (2013.01)

(56) References Cited

U.S. PATENT DOCUMENTS 1,331,701 A * 2/1920 Fendelman .......... A42B 1/0182 2/10
2,644,212 A * 7/1953 Markowitz .......... B43K 23/001 24/11 R
3,768,100 A * 10/1973 Colman ............. A41D 13/1161 2/9
4,032,991 A * 7/1977 Vandeweghe ...... A41D 13/1153 2/206
4,768,235 A * 9/1988 Webster ................... A42C 5/04 2/205
5,035,006 A * 7/1991 Hetz ...................... A41D 15/04 2/200.1
5,091,996 A * 3/1992 Kirby ................... A42B 1/0187 2/202
5,214,804 A * 6/1993 Carey .................... A41D 23/00 2/9
5,575,009 A * 11/1996 Ryvin ................ A41D 13/1161 2/202
5,628,308 A * 5/1997 Harges, Jr. ......... A41D 13/1153 128/206.28
5,644,799 A * 7/1997 Armenta .................. A45D 8/34 132/273
5,694,928 A * 12/1997 Hoftman ............ A41D 13/1209 128/206.19
5,704,068 A * 1/1998 Martin ................... A42B 1/046 2/202
5,794,276 A * 8/1998 Walker ................... A41D 13/11 128/202.19
5,839,432 A * 11/1998 Daneshvar ............... A42C 5/04 2/205
5,845,340 A * 12/1998 Frislie .................... A42B 1/046 2/202
6,023,787 A * 2/2000 French ................... A42B 1/048 2/202
6,269,489 B1 * 8/2001 Heath .................... A42B 1/046 2/202
6,272,690 B1 * 8/2001 Carey ................ A41D 13/1153 2/9
6,397,395 B1 * 6/2002 DeHart .................. A41D 3/005 2/202
6,754,909 B1 * 6/2004 Samelian ............... A41D 13/11 2/206
8,074,300 B1 * 12/2011 Molina .................. A42B 1/048 2/5
11,000,624 B1 * 5/2021 Babcock ................... A61L 9/20
2003/0009815 A1 * 1/2003 Azu ......................... A45D 8/40 2/202
2005/0015850 A1 * 1/2005 Waldman ............... A42B 1/046 2/205
2005/0132459 A1 * 6/2005 Cheng ................ A41D 13/1161 2/202
2006/0085881 A1 * 4/2006 Gellis ................ A41D 13/1153 2/9
2006/0130213 A1 * 6/2006 Mickle ................... A42B 1/046 2/202
2009/0071483 A1 * 3/2009 Son ...................... A62B 18/025 128/206.13
2009/0151049 A1 * 6/2009 Conrardy ............. A42B 1/0187 2/206
2009/0255030 A1 * 10/2009 Guy ....................... A42B 1/225 2/195.3
2009/0320835 A1 * 12/2009 Lin .......................... A62B 7/10 128/201.15
2010/0064417 A1 * 3/2010 Fruge ..................... A42B 1/046 2/202
2011/0185482 A1 * 8/2011 Godfrey ............. A41D 13/1161 2/455
2012/0245498 A1 * 9/2012 Krenzel ................ A61F 5/3738 602/4
2014/0096302 A1 * 4/2014 De Ricco ............... A41D 23/00 2/69
2014/0096305 A1 * 4/2014 Friesen .................. A41D 15/04 2/84
2014/0196200 A1 * 7/2014 Beliveau ................ A41D 13/11 2/424
2015/0113711 A1 * 4/2015 Kim ....................... A42B 1/205 2/424
2016/0227952 A1 * 8/2016 Daring ................... A44B 15/00
2016/0374415 A1 * 12/2016 Chang .................... A41D 15/00 2/69
2017/0055597 A1 * 3/2017 Lekven .............. A41D 13/1161
2017/0079343 A1 * 3/2017 Chen ...................... A41D 13/11
2017/0196280 A1 * 7/2017 Murphy ............. A41D 13/1161
2017/0258166 A1 * 9/2017 Charles, Jr. ............ A42B 1/225
2018/0007995 A1 * 1/2018 Morales .................... A41D 1/04
2018/0146733 A1 * 5/2018 Greenblat .............. A42B 1/046
2020/0068974 A1 * 3/2020 Schlabach ................ A42B 7/00
2021/0076751 A1 * 3/2021 Dubose .................... A41F 17/00
2021/0127773 A1 * 5/2021 Lowder .................. A41D 27/28
2021/0283433 A1 * 9/2021 Yeh ...................... A62B 18/086
2021/0298368 A1 * 9/2021 Bussey ................ A47C 31/003
2021/0361014 A1 * 11/2021 Bono ...................... A42B 1/225
2022/0053849 A1 * 2/2022 Morton .............. A41D 13/1107
2022/0095731 A1 * 3/2022 Carey .................... A42B 1/205

FOREIGN PATENT DOCUMENTS

JP 2019-502038 A 1/2019
WO 2020159895 A1 8/2020

OTHER PUBLICATIONS

Office Action dated Nov. 9, 2022 in related Canadian Patent Application No. 3,128,344, in 3 pages.
Notice of Reasons for Refusal dated Jul. 18, 2023 in related JP Patent Application No. 2021-555577, in 18 pages.

* cited by examiner

MODULAR HEAD GARMENT

CROSS-REFERENCE TO RELATED APPLICATIONS

This application claims priority to U.S. Provisional Patent App. No. 62/798,351, filed on Jan. 29, 2019, which is hereby incorporated herein by reference as if set forth in full.

BACKGROUND

Field of the Invention

The present invention generally relates to cold weather clothing and, more particularly, to a head garment having a removable face covering.

Related Art

In cold-weather environments, it is often desirable to wear a head garment in order to keep the head and body warm. One problem with conventional head garments is that, when the user is active and generating body heat, the head garment may cause the user to overheat. In addition, conventional head garments that cover the face of the user often frustrate the ability of the user to be heard and understood when the user is attempting to speak, as well as when the user is attempting to conduct other activities, such as eating, drinking, and/or the like.

Some conventional head garments have detachable masks that can be removed, in order to allow excess heat to escape and to allow the user to effectively communicate. However, such head garments suffer from the ability of the detachable mask portion to become lost, thereby reducing the effectiveness of the head garment in cold weather. In addition, such head garments suffer from the difficulty in aligning and attaching each of the fasteners that join the mask to the head garment, especially while the user is wearing other cold-weather gear, such as gloves. This problem could be addressed by replacing mechanical fasteners (e.g., snaps and buttons) with magnets. However, the problem would still exist that cold air and wind can reach the face of the user through gaps between the fasteners, which also reduces the effectiveness of the head garment in cold weather.

Therefore, what is needed is a head garment that overcomes one or more of the problems found in conventional head garments.

SUMMARY

Accordingly, an improved head garment is disclosed. In an embodiment, the head garment comprises: a nose covering portion comprising a nose bridge portion, an upper lip portion below the nose bridge portion, and a through-hole between the nose bridge portion and the upper lip portion, wherein the nose bridge portion is positioned to, when the head garment is worn by a user, cover a bridge of a nose of the user, wherein the upper lip portion is positioned to, when the head garment is worn by the user, cover an upper lip of the user, and wherein the through-hole is positioned to, when the head garment is worn by the user, provide a passageway between nostrils of the user and an external environment of the head garment. The nose covering portion may be made from a stretchable material, including a fabric such as fleece (e.g., NEOFLEECE®). The nose covering portion may be fixed in a loop, such that, when the head garment is worn by the user, the nose covering portion is configured to encircle a bottom portion of a head of the user. The nose covering portion may comprise an outer perimeter and an inner perimeter, wherein the inner perimeter defines an opening that is positioned to, when the head garment is worn by the user, surround eyes of the user, wherein the nose covering portion comprises a forehead portion between the inner perimeter and the outer perimeter at an upper portion of the nose covering portion, and wherein the forehead portion is positioned to, when the head garment is worn by the user, cover a forehead of the user.

In an embodiment, the head garment further comprises goggles configured to cover the opening. The goggles may be affixed to the nose covering portion.

In an embodiment, the head garment further comprises: a head covering portion affixed to the nose covering portion, wherein the head covering portion is positioned to, when the head garment is worn by the user, cover a forehead and a back of a head of the user. The head covering portion may comprise a passageway that, when the head garment is worn by the user, is positioned on the back of the head of the user, wherein the passageway is configured to be manually opened from a closed configuration and allow hair of the user to pass from an interior of the head garment to the external environment of the head garment. The head covering portion may comprise a skull cap. The nose covering portion may comprise two end portions, wherein each end portion is configured to, when the head garment is worn by the user, wrap around a side of the head of the user, and wherein the nose covering portion is permanently affixed to an interior surface of the head covering portion. Each end portion may be configured to, when the head garment is worn by the user, wrap around to a back of the head of the user, and wherein, when the head garment is worn by the user, the nose covering portion is permanently affixed to the interior surface of the head covering portion behind the head of the user.

In an embodiment, the head garment further comprises: a neck covering portion comprising an upper edge and a first fastener portion in an upper region of the neck covering portion, wherein the nose covering portion further comprises a lower edge and a second fastener portion, and wherein the first fastener portion and the second fastener portion are configured to engage to each other and disengage from each other via manual force. When the head garment is worn by the user, while the first fastener portion and the second fastener portion are engaged, the first fastener portion and the second fastener portion may be positioned on a front of a head of the user. The nose covering portion and the neck covering portion may be permanently affixed to each other along at least a portion of the lower edge of the nose covering portion and the upper edge of the neck covering portion. When the head garment is worn by the user, the nose covering portion may be permanently affixed to the neck covering portion on one or both of a side of a head of the user or behind the head of the user. In an embodiment, when the head garment is worn by the user: when the first fastener portion and the second fastener portion are disengaged from each other, an opening is formed over a mouth of the user; and, when the first fastener portion and the second fastener portion are engaged to each other, the opening is closed such that the mouth of the user is covered by the neck covering portion. Each of the first fastener portion and the second fastener portion may comprise one or more magnets. Each of the first fastener portion and the second fastener portion may comprise two or more fastening components, and wherein each fastening component of the first fastener portion is configured to engage with a corresponding fastening component of the second fastener portion. The second fastener portion may comprise a first fastening component on a first side of the through-hole, and a second fastening component on a second side of the through-hole. Each of the two or more fastening components of the first fastener portion may comprise a bar magnet, wherein each of the two or more fastening components of the second fastener portion may comprise a disk magnet. The neck covering portion may have a tubular shape. The head garment may comprise a third fastener portion on an interior surface of the head garment and a fourth fastener portion on an exterior surface of the head garment, wherein the third fastener portion and the fourth fastener portion are configured to engage with each other and disengage from each other via manual force. Each of the third fastener portion and the fourth fastener portion may comprise two or more fastening components, wherein each fastening component of the third fastener portion is configured to engage with a corresponding fastening component of the fourth fastener portion. The two or more fastening components of the third fastener portion may comprise one of a set of hooks or a set of loops, wherein the two or more fastening components of the fourth fastener portion comprise the other one of a set of hooks or a set of loops. The third fastener portion may be positioned on an interior surface of the nose covering portion, wherein the fourth fastener portion is positioned on an exterior surface of the neck covering portion.

Other features and advantages of the present disclosure will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1A:
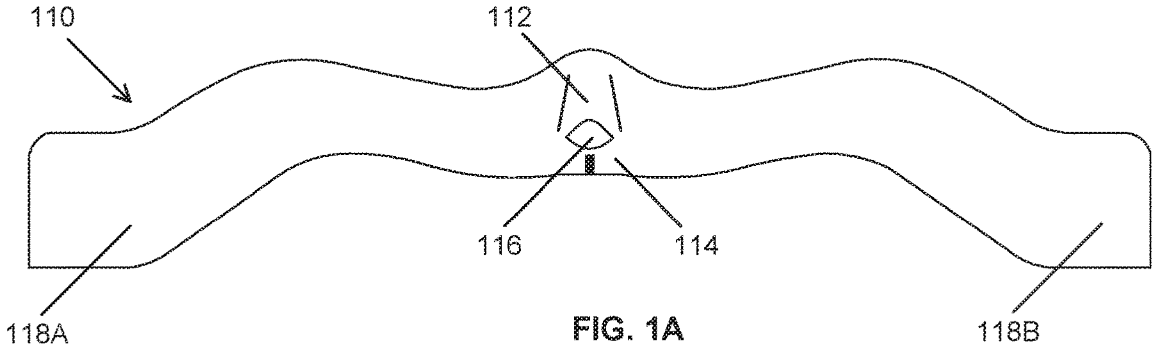
FIGS. 1A-1C illustrate various views of an example nose covering portion of a head garment, according to a first embodiment.

A head garment is disclosed herein. As used herein, the term "head garment" refers to any garment that can be worn on the head, face, or neck, or any combination thereof. For example, the head garment may comprise a head covering portion that covers at least part of the head, a nose covering portion that covers at least part of the nose, or a neck covering portion that covers at least part of the neck, as well as any combination of a head covering portion, nose covering portion, and neck covering portion. For instance, the head garment may comprise only the head covering portion, only the nose covering portion, only the neck covering portion, all three of the head covering portion, nose covering portion, and neck covering portion, only the head covering portion and nose covering portion, only the nose covering portion and the neck covering portion, or only the head covering portion and neck covering portion.

In any embodiment of a head garment that comprises a combination of any two or all of the head covering portion, nose covering portion, neck covering portion. The head garment, including the one or more portions, may be made from a single piece of material or a plurality of pieces of material. Examples of possible materials that may be used to construct any of the portions include, without limitation, fleece, neofleece® (i.e., fleece-lined neoprene fabric), fabric, neoprene, polymer, laminates, and/or membranes (e.g., rubber, elastomer, etc.). Different portions may be constructed using the same materials and/or different materials as other portions, and the portions themselves may comprise a single piece of material or a plurality of pieces of the same and/or different materials. In an embodiment, all of the portions of a head garment, comprising any combination of a head covering portion, nose covering portion, and/or neck covering portion, may be constructed as modular units that are then affixed to each other to form a single integrated unit.

In an embodiment that comprises a combination of a head covering portion, nose covering portion, and/or neck covering portion, each including portion may be modular. In other words, each portion in the combination may be constructed separately and then affixed together into the combination. Two or more of the portions in the combination may be permanently affixed or releasably affixed. In some cases, two or more portions may be permanently affixed in one region and releasably affixed in another portion, such that they may be partially separated from each other without being completely separated from each other.

Throughout the present description, "permanently affixed" refers to any means of permanently affixing two pieces of material together at one or more points, including permanently affixing two or more of the head covering portion, nose covering portion, and neck covering portion together. For purposes of illustration, stitching will be shown as the primary means for permanently affixing two pieces of material together. For example, two or more of the portions may be sewn together using thread. However, other means of permanently affixing two or more things together may be used instead of stitching, including, without limitation, heat seals and/or the like.

Throughout the present description, "releasably affixed" refers to any means of fastening two pieces of material together at one or more points, such that they may be subsequently separated from each other at those point(s). Examples of such fastening means comprise, without limitation, magnets, hooks and loops (e.g., VELCRO®), zippers, snaps, buttons, buckles, friction, and/or the like. Regardless of which fastening means is used, the fastening means should be sufficiently strong to keep the materials releasably affixed to each other against normal ambient forces (e.g., wind and other weather, regular motion during recreational or other activities, etc.), but weak enough that the user can manually release the materials from each other using his or her hands (e.g., by pulling on one or both of the materials).

Some of the figures herein will illustrate embodiments of the head garment with transparent layers to show internal structures. It should be understood that, in reality, the material used to construct these embodiments of the head garment will generally be opaque, such that the internal structures are not visible from an exterior of the head garment, and vice versa.

After reading this description, it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various embodiments should not be construed to limit the scope or breadth of the present invention as set forth in the appended claims.

Figure 1B:
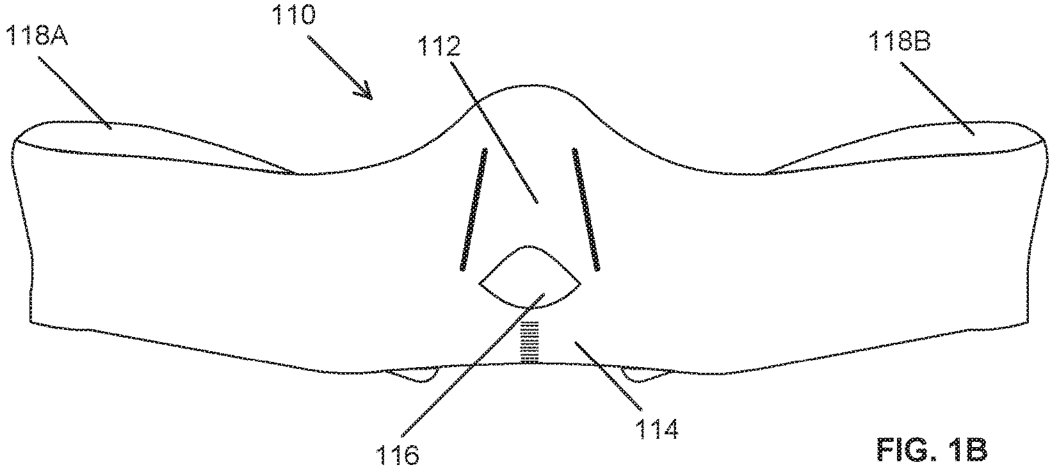
Figure 1C:
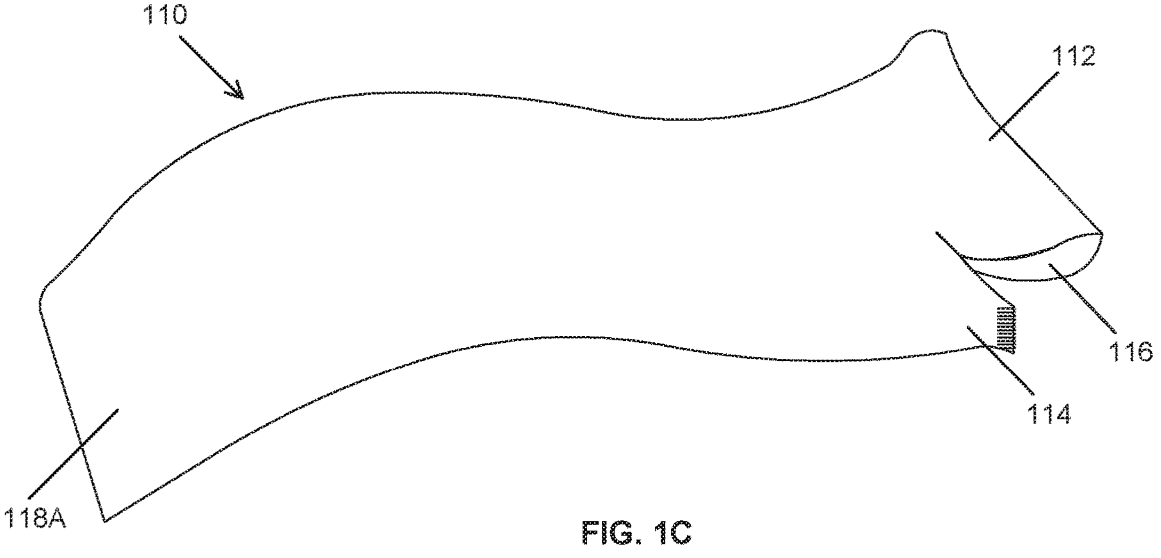

FIGS. 1A-1C illustrate various views of an example nose covering portion 110 of a head garment 100, according to a first embodiment. Specifically, FIG. 1A illustrates a front view while nose covering portion 110 is in a flat configuration, FIG. 1B illustrates the front view while nose covering portion 110 is in a round configuration, and FIG. 1C illustrates a side view of nose covering portion 110. In this first embodiment, nose covering portion 110 comprises a nose band masque.

Nose covering portion 110 comprises an upper perimeter that defines a nose bridge portion 112. Nose bridge portion 112 is configured to engage the bridge of the nose of the user when nose covering portion 110 is worn. Nose covering portion 110 also comprises a lower perimeter that defines an upper lip portion 114. Upper lip portion 114 is configured to engage the upper lip of the user when nose covering portion 112 is worn. Nose covering portion 110 may also comprise a cutout between the upper perimeter and the lower perimeter, at the base of nose bridge portion 112, that defines a through-hole 116 passing from one surface of nose bridge portion 112 to the opposing surface of nose bridge portion 112. Through-hole 116 provides an opening at the nostrils of the user when nose covering portion 112 is worn, such that the user's nostrils may continue to breathe air from the external environment and breathe out carbon dioxide to the external environment, while the user is wearing nose covering portion 112.

As illustrated in FIG. 1B, in the round configuration, nose covering portion 110 forms at least a partial circle with end portions 118A and 118B brought near to each other. End portions 118A and 118B may be permanently or releasably affixed to each other to form nose covering portion 110 into a complete circle. If releasably affixed, end portions 118A and 118B may comprise corresponding fastening means, that allow the user to fasten nose covering portion 110 around his or her face, as well as release nose covering portion 110 from around his or her face. Alternatively, nose covering portion 110 may comprise a continuous circle without any end portions 118 or the seam may be placed elsewhere. As yet another alternative, end portions 118A and 118B may be affixed to another portion described herein (e.g., head covering portion 120 and/or neck covering portion 130), without being affixed to each other.

In any case, nose covering portion 110 may be made from stretchable material, such that nose covering portion 110 can stretch around the face to secure nose covering portion 110 around the head and face of a plurality of different users with different head diameters and/or having different sized noses, mouths, and/or other facial features. As illustrated by the side view in FIG. 1C, the side profile of nose covering portion 110 matches the side profile of the human face from the top of the nose to the upper lip. Thus, when nose covering portion 110 is worn by the user, nose bridge portion 112 snugly contacts the bridge of the user's nose, and upper lip portion 114 snugly contacts the user's upper lip. As a result, through-hole 116 provides an opening for the user to breathe through his or her nostrils while nose covering portion 110 is worn.

Figure 2A:
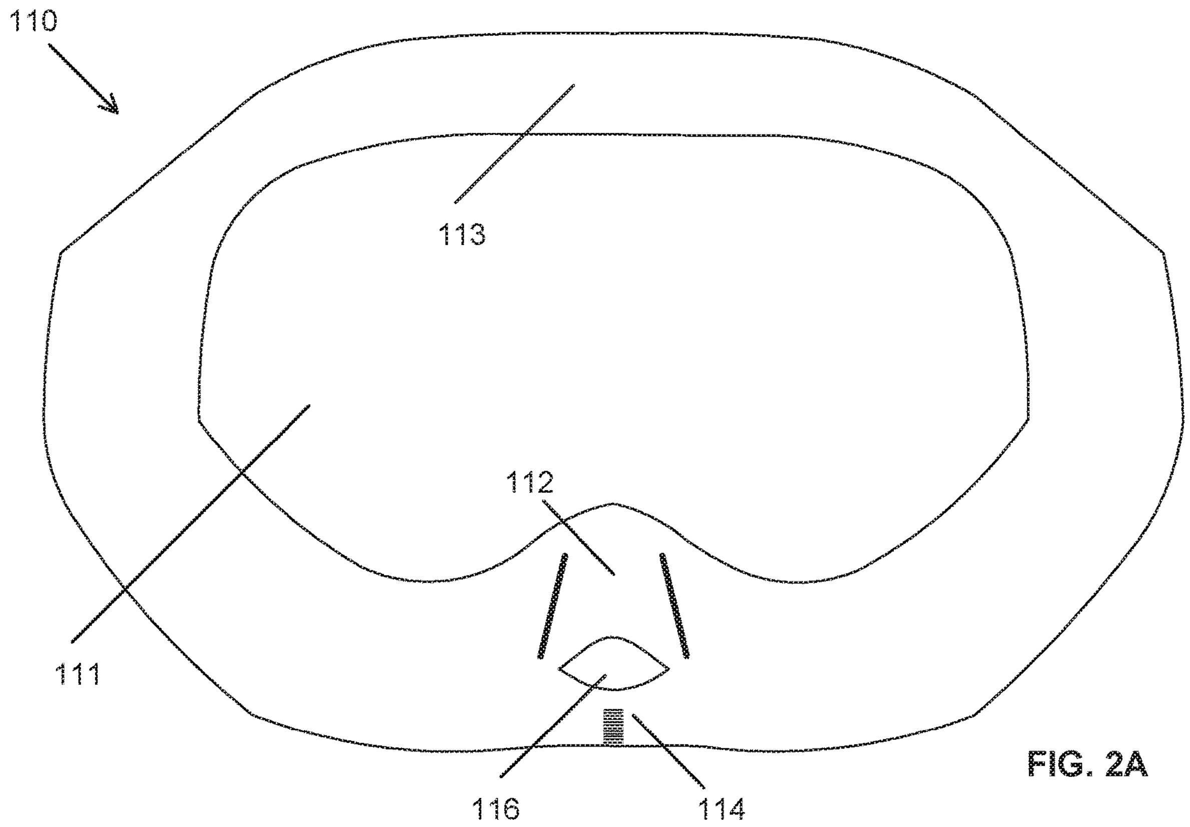
FIGS. 2A-2C illustrate various views of an example nose covering portion of a head garment, according to a second embodiment.
Figure 2B:
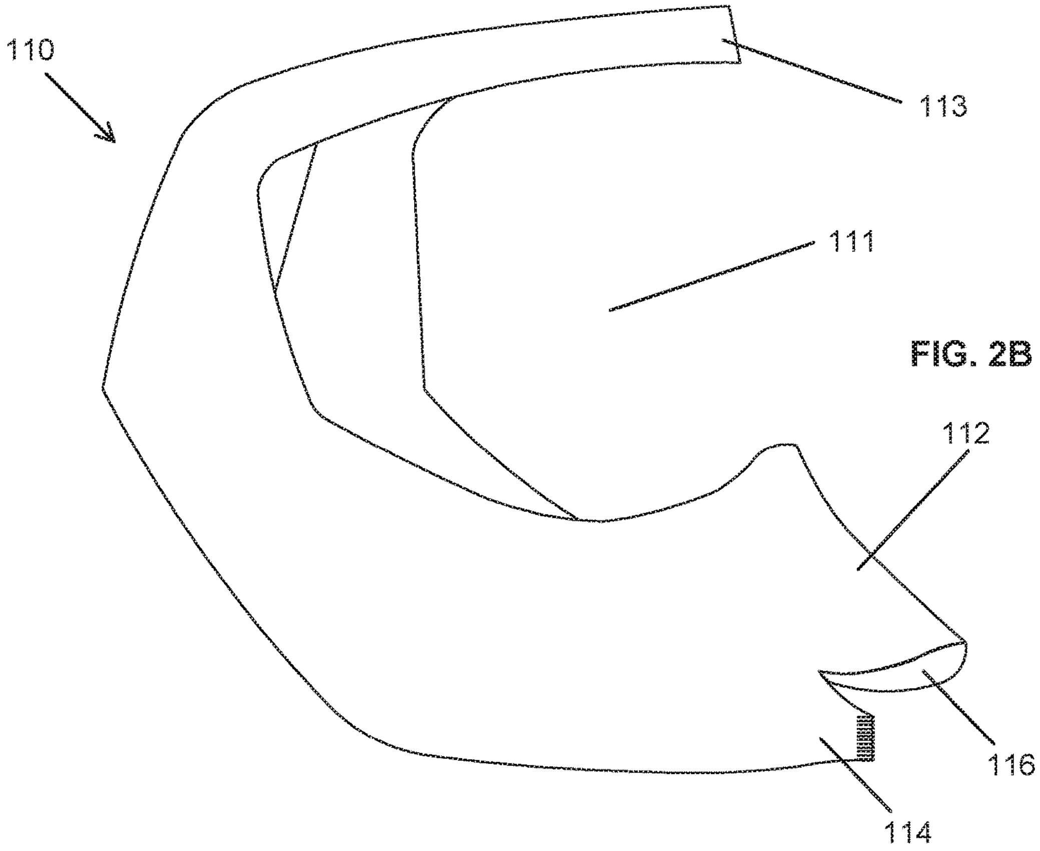
Figure 2C:
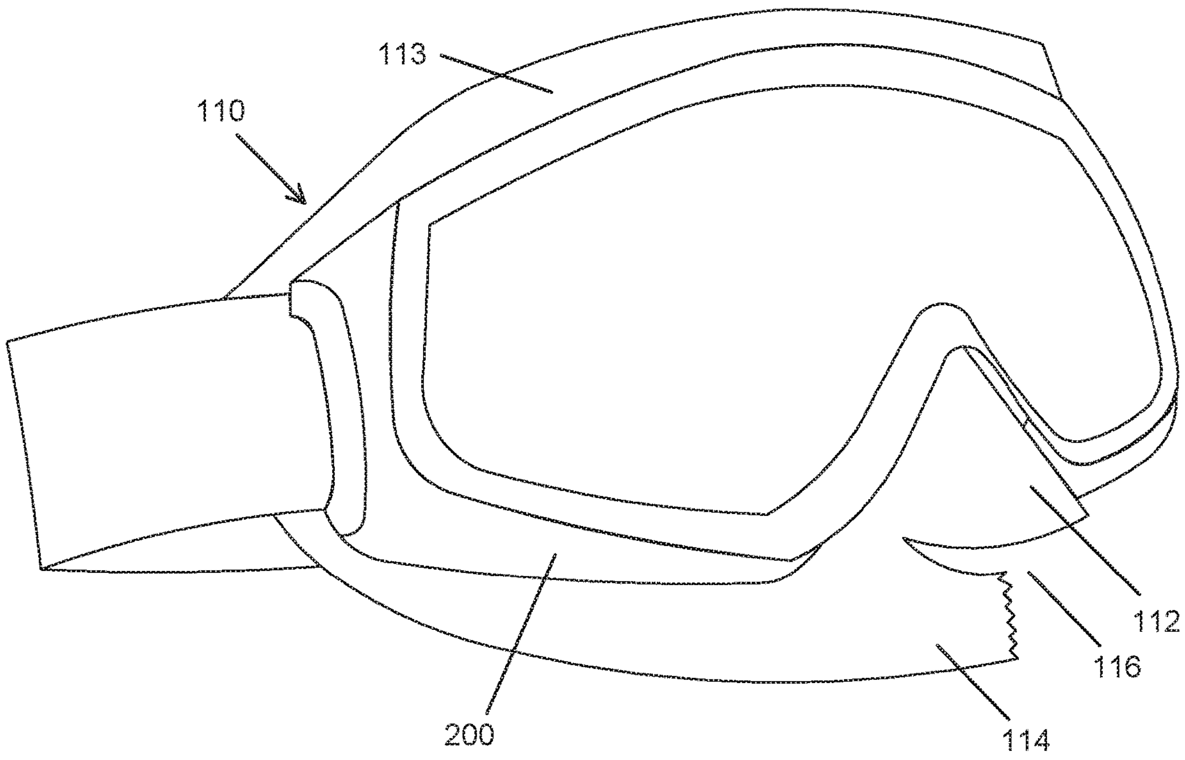

FIGS. 2A-2C illustrate various views of an example nose covering portion 110 of a head garment 100, according to a second embodiment. Specifically, FIG. 2A illustrates a front view of nose covering portion 110, FIG. 2B illustrates a side perspective view of nose covering portion 110B, and FIG. 2C illustrates nose covering portion 110 with goggles 200. In this second embodiment, nose covering portion 110 comprises a face masque, instead of a nose band masque.

As in the first embodiment, nose covering portion 110 comprises a nose bridge portion 112, an upper lip portion 114, and a through-hole 116 for the user's nose. However, as illustrated in FIG. 2A, in this second embodiment, nose covering portion 110 has a generally oval profile from the front, with an outer perimeter, and an inner perimeter that defines an opening 111. The inner perimeter, defining opening 111, is configured to surround the user's eyes when nose covering portion 110 is worn. Thus, the user is able to see through opening 111 when wearing nose covering portion 110.

In contrast to the first embodiment of nose covering portion 110, the second embodiment of nose covering portion 110 comprises a forehead portion 113. Forehead portion 113 is positioned at a top of nose covering portion 110 and is configured to contact and cover at least a portion of the user's forehead when nose covering portion 110B is worn by the user.

In an embodiment, the perimeter of opening 111 may be configured to be used with goggles 200, as illustrated in FIG. 2C. Goggles 200 may be separate from or integrated with nose covering portion 110. For example, the external surface of the perimeter of opening 111 may be configured to attach to or be integrated with an inner surface of goggles 200 (i.e., a surface of goggles 200 that faces the user's face when goggles 200 are worn). In this case, the interior surface of the perimeter of opening 111 may directly contact the skin of the user's face and may be positioned between the skin of the user's face and the inner perimeter of goggles 200. Notably, as illustrated in FIG. 2C, through-hole 116 continues to allow the user to breathe through his or her nostrils, even when goggles 200 are worn by the user.

In an embodiment, nose covering portion 110 is permanently affixed to goggles 200 (e.g., between the outer perimeter and inner perimeter that defines opening 111). Alternatively, goggles 200 may be releasably affixed to nose covering portion 110B (e.g., between the outer perimeter and inner perimeter that defines opening 111, etc.). As yet another embodiment, goggles 200 may be configured to cover opening 111 in nose covering portion 110 without being affixed to nose covering portion 110. In this case, goggles 200 may be slid over nose covering portion 110 to cover opening 111 and slid off nose covering portion 110 to uncover opening 111.

In an embodiment, the outer perimeter of nose covering portion 110 may extend beyond the outer perimeter of goggles 200 around the entire outer perimeter of goggles 200. Alternatively, the outer perimeter of nose covering portion 110B may be flush (e.g., co-extensive) with the outer perimeter of goggles 200 in an upper portion (e.g., forehead portion 113), but extend beyond the edge of the outer surface of the goggles in a lower portion of the goggles. It should be understood that other alternatives are also possible.

Figure 3A:
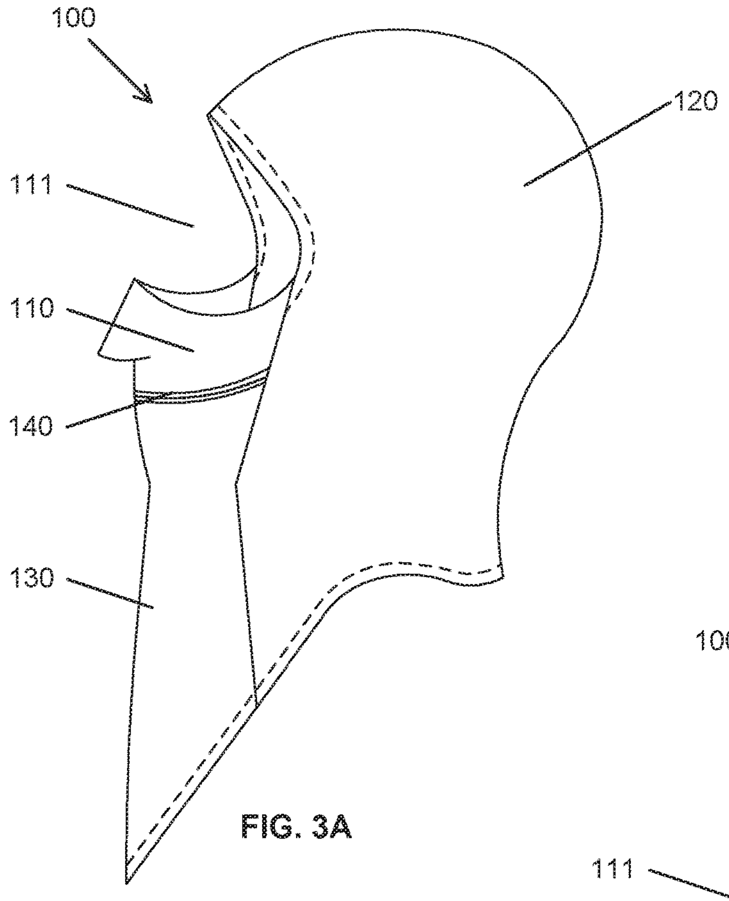
FIGS. 3A and 3B illustrate side views of an example head garment in closed and open configurations, respectively, according to an embodiment.
Figure 3B:
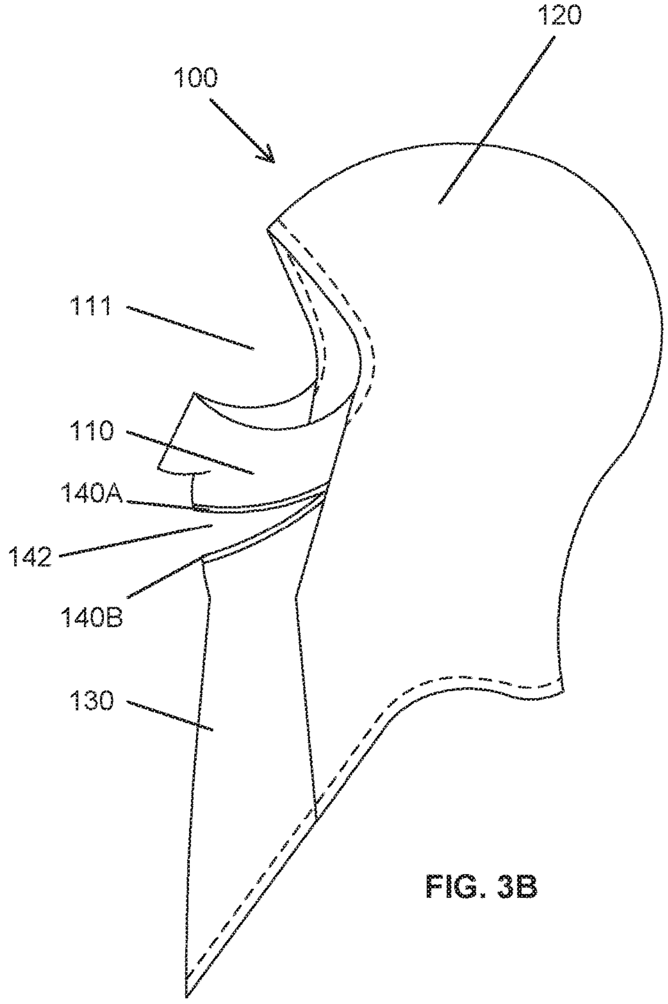

FIGS. 3A and 3B illustrate side views of an example head garment 100 in closed and open configurations, respectively, according to an embodiment. In the illustrated embodiment, head garment 100 comprises a nose covering portion 110 that is integrated with a head covering portion 120 and a neck covering portion 130. In the description, it will be assumed that nose covering portion 110, head covering portion 120, and neck covering portion 130 are modular pieces that have been integrated into a single head garment 100 via stitching. However, it should be understood that other configurations are possible.

In the illustrated embodiment, head covering portion 120 covers the user's forehead and extends around the back of the user's head when head garment 100 is worn by the user. In addition, neck covering portion 130 surrounds and covers at least a front portion of the user's neck when head garment 100 is worn by the user. Head covering portion 120 is illustrated as extending down to and covering the back and a portion of the side of the user's neck, and neck covering portion 130 is illustrated as extending only around the front and a portion of the sides of the user's neck and being fixed to head covering portion 120 at the sides of the user's neck, when head garment 100 is worn. However, in an alternative embodiment, neck covering portion 130 could extend around the entirety of the user's neck, from front to sides to back, while head covering portion 120 covers the user's forehead and the back of the user's head and is fixed to neck covering portion 130 around the top of the neck, when head garment 100 is worn. It should be understood that other configurations of head covering portion 120 and neck covering portion 130 are also possible, with a preference that, in the closed configuration, the surface of the user's entire head and neck is covered, except within opening 111 and through-hole 116.

In the illustrated embodiment, nose covering portion 110 is affixed to head covering portion 120. For example, nose covering portion 110 may be permanently affixed to head covering portion 120 around at least the upper portion of the perimeter of opening 111. An exterior surface of nose covering portion 110 may be affixed to an interior surface of head covering portion 120, or an interior surface of nose covering portion 110 may be affixed to an exterior surface of head covering portion 120.

In addition, at least a portion of the bottom edge of nose covering portion 110 may be releasably affixed to at least a portion of the top edge of neck covering portion 130 via a fastener 140. For example, the bottom edge of nose covering portion 110 may comprise one fastener portion 140A, whereas the top edge of neck covering portion 130 comprises the corresponding fastener portion 140B. In an embodiment, fastener portion 140A comprises one or more magnets and fastener portion 140B comprises one or more magnets that are magnetically attracted to the one or more magnets of fastener portion 140A. The magnet(s) of fastener portion 140A may be encased in piping at the bottom edge of nose covering portion 110, and the magnet(s) of fastener portion 140B may be encased in piping at the top edge of neck covering portion 130. Both pipings may comprise fabric or other material that is the same or different than the material(s) used for nose covering portion 110 and neck covering portion 130. The magnet(s) of fastener portions 140A and 140B may take any cross-sectional shape (e.g., circle, square, rectangle, triangle, etc.), but preferably have the same shape as each other. For example, each of fastener portions 140A and 140B may comprise a plurality of cylindrically shaped magnets that are longitudinally aligned throughout respective cylindrically shaped pipings. The fact that a plurality of such magnets are used allows each fastener portion 140A and 140B to curve with the curvature of their respective pipings.

As illustrated in FIG. 3A, in the closed configuration, fastener portion 140A and 140B are magnetically engaged to each other, so as to releasably fasten the bottom edge of nose covering portion 110 to the top edge of neck covering portion 130. As a result, head garment covers the user's entire head and neck, except at opening 111 and through-hole 116. In contrast, as illustrated in FIG. 3B, in the open configuration, fastener portions 140A and 140B are disengaged, so as to unfasten the bottom edge of nose covering portion 110 from the top edge of neck covering portion 130, such that a mouth opening 142 is formed in head garment 100. In an embodiment, nose covering portion 110 and neck covering portion 130 are positioned with respect to each other and head covering portion 120, such that mouth opening 142 is positioned in front of the user's mouth, when head garment 100 is worn. Thus, when head garment 100 is worn, mouth opening 142 exposes the user's mouth to the external environment of head garment 100. Accordingly, the user may more easily talk, eat, drink, and/or breathe through his or her mouth than in the closed configuration. While any strength of magnets may be chosen for fastener 140, the magnets should be chosen so that the magnetic attraction between fastener portion 140A and fastener portion 140B is sufficiently strong to keep fastener portions 140A and 140B sealed against ambient forces (e.g., wind and other weather, the user's motion during recreational or other activities, etc.), but weak enough that the user can easily unseal fastener portions 140A and 140B using a simple pull (e.g., on an upper part of neck portion 130) by his or her hand. Conversely, the user can seal mouth opening 142 shut by simply pulling the lower edge of nose covering portion 110 and/or the upper edge of neck covering portion 130 together.

FIGS. 4A-4E illustrate various views of an example head garment 100, according to an embodiment that is similar to the embodiment illustrated in FIGS. 3A and 3B. As in that embodiment, head garment 100 comprises a combination of a nose covering portion 110, head covering portion 120, and neck covering portion 130. However, in this embodiment, head garment 100 comprises the nose covering portion 110 illustrated in FIGS. 1A-1C, whereas the embodiment illustrated in FIGS. 3A and 3B comprises the nose covering portion 110 illustrated in FIGS. 2A-2C.

Figure 4A:
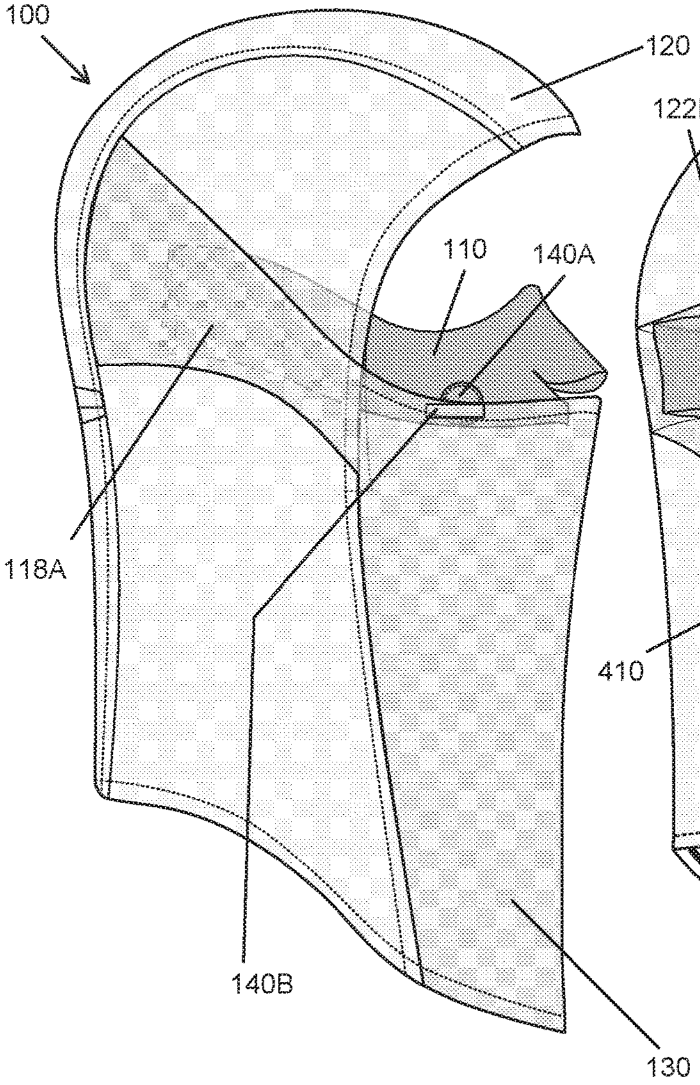
FIGS. 4A-4E illustrate various views of an example head garment, according to an embodiment.
Figure 4B:
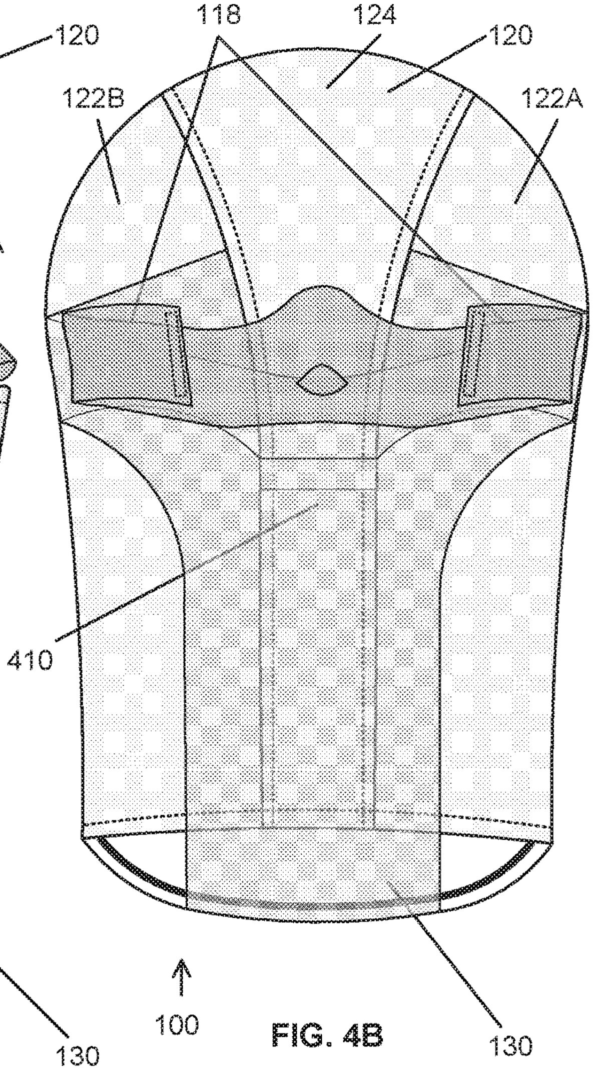
Figure 4C:
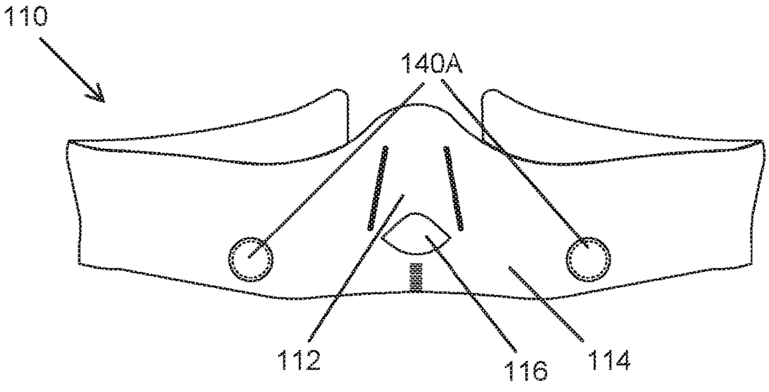
Figure 4D:
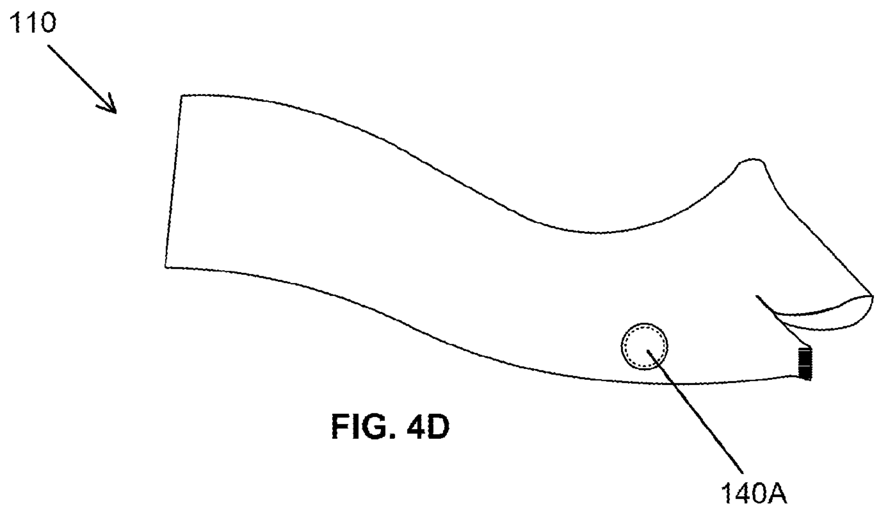
Figure 4E:
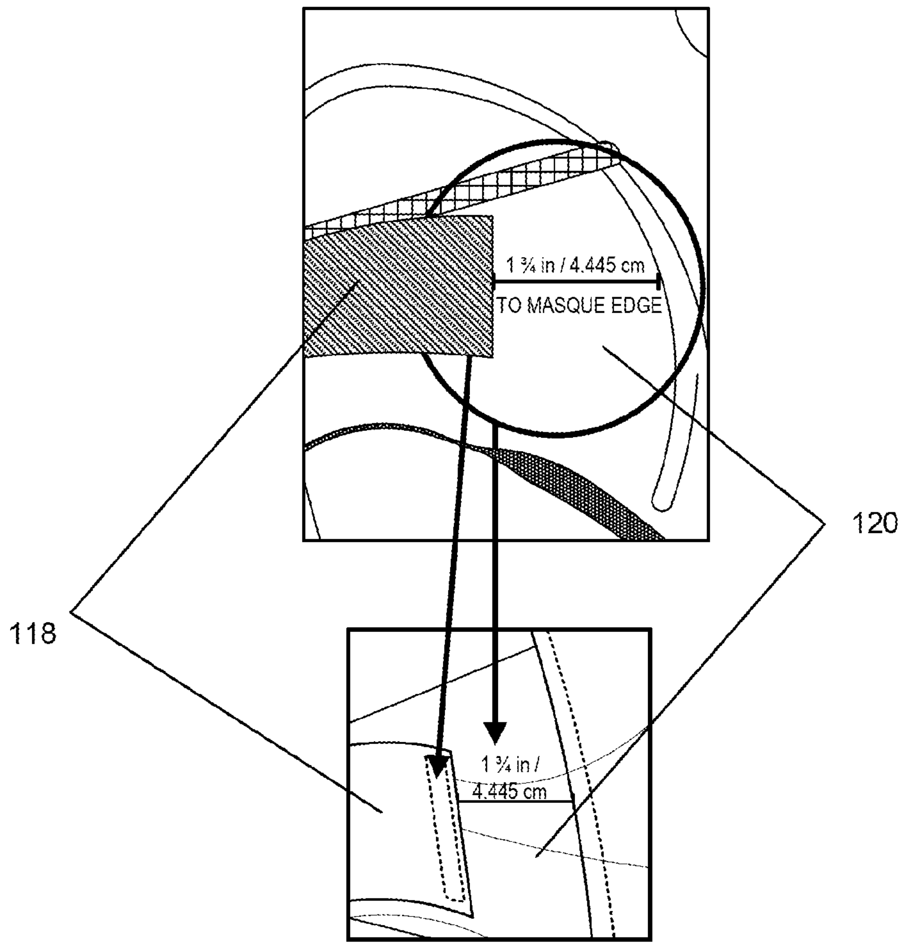

FIG. 4A illustrates a side view of head garment 100, and FIG. 4B illustrates a back view of head garment 100. FIG. 4C illustrates a front view of nose covering portion 110 in isolation, and FIG. 4D illustrates a side view of nose covering portion 110 in isolation. In addition, FIG. 4E illustrates how nose covering portion 110 can be affixed to head covering portion 120 on an interior surface of head covering portion 120.

FIG. 4A illustrates an embodiment of fastener 140 in a closed configuration. As shown, fastener portion 140A on the bottom edge of nose covering portion 110 comprises at least one disk magnet (e.g., a circular magnet). As illustrated in FIG. 4C, fastener portion 140A may comprise two such disk magnets on either side of nose bridge portion 112 and through-hole 116, near the lower peripheral edge of nose covering portion 110. As an example, the distance between a center point of the bottom edge of nose covering portion 110 (i.e., centered with respect to a line that bisects nose bridge portion 112 and through-hole 116) and the center of each disk magnet may be 2.5 inches or 6.35 centimeters, or, as another example, 3.5 inches or 8.89 centimeters. In addition, for each disk magnet, the minimum distance between the bottom edge of nose covering portion 110 and the center of the disk magnet may be 0.5 inches or 1.27 centimeters, or, as another example, 0.625 inches or 1.5875 centimeters.

As illustrated, fastener portion 140B on the top edge of neck covering portion 130 comprises a bar magnet. Each bar magnet of fastener portion 140B corresponds to one of the disk magnets of fastener portion 140A. In other words, each bar magnet of fastener portion 140B is positioned so as to contact one of the disk magnets of fastener portion 140A, to thereby magnetically attach an upper edge of neck covering portion 130 to a bottom edge of nose covering portion 110. Thus, the distance between the centers of the bar magnets of fastener portion 140B may be identical or similar to the distance between the centers of the disk magnets of fastener portion 140A. As an example, the inside edge of each bar magnet may be positioned 2.5 inches or 6.35 centimeters from the front center line of neck covering portion 130.

While fastener portion 140A is shown as comprising disk magnets and fastener portion 140B is shown as comprising bar magnets, these fastener portions may comprise the same shape and size of magnets (e.g., both portions having the same size of disk magnets, both portions having the same size of bar magnets) or may comprise any mixture of shapes and sizes of magnets (e.g., fastener portion 140A comprising bar magnets and fastener portion 140B comprising disk magnets, or more generally fastener portion 140A comprising a first shape of magnet and fastener portion 140B comprising a second shape of magnet that is different than the first shape). In any case, when fastener portion 140A is magnetically attached to fastener portion 140B, fastener 140 releasably seals or affixes neck covering portion 130 to nose covering portion 110, so as to cover the user's mouth. In this closed configuration, head garment 100 covers the user's entire head and neck, front to back, with the exception of opening 111 (unless covered by goggles 200) and through-hole 116. Again, the magnets used may be selected so that the magnetic attraction is sufficient to hold the seal through normal activity, but easily release the seal when the user exerts a pulling force, for example, on the top portion of neck covering portion 130. Thus, the user may effortlessly transition between the closed configuration and the open configuration, for example, to more freely breath, talk, drink, eat, and/or the like.

In an embodiment, each of the magnets of fastener portions 140A and 140B may be enclosed, so as to be hidden from view. For example, the magnets may be positioned inside a hem seam in their respective portions. Specifically, the disk magnets of fastener portion 140A may be stitched into place underneath disk-shaped material that is the same as the material used for nose covering portion 110. In addition, the bar magnets of fastener portion 140B may be hemmed into piping on the top edge of neck covering portion 130.

In an embodiment, as illustrated in the back view of FIG. 4B, head covering portion 120 may comprise a passage 410 that is positioned near (e.g., slightly above) or in the proximity of the base of the back of the user's head when head garment 100 is worn. Passage 410 may comprise two lips (e.g., formed from the same or different materials as head covering portion 120). When no force is exerted the lips contact each other, such that no opening is formed. However, when force is exerted, the lips can be opened to allow passage of the user's hair from the interior of head garment 100 to the exterior of head garment 100 between the lips of passage 410. Thus, when head garment 100 is worn, the user may pull his or her hair (e.g., ponytail) through passage 410, so that the hair extends away from the user's head and outside of head garment 100.

FIGS. 4C and 4D illustrate an example of nose covering portion 110 in isolation. Again, in the illustrated embodiment, fastener portion 140A comprises a plurality of magnets. In this particular embodiment, fastener portion 140A comprises two disk magnets that are spaced apart on either side of nose covering portion 110. Specifically, a first disk magnet is positioned on one side of through-hole 116, and a second disk magnet is positioned on the opposite side of through-hole 116.

FIG. 4E illustrates features in the interior of head garment 100, according to an embodiment. In this embodiment, end portions 118 of nose covering portion 110 are affixed to head covering portion 120. Specifically, at least a portion (e.g., one or more peripheral edges) of the outer surfaces of end portions 118 are stitched to contact and engage a portion of the interior surface of head covering portion 120. Thus, nose covering portion 110 is permanently affixed to head covering portion 120, but is still able to stretch around differently sized and shaped heads and faces.

In the illustrated embodiment, head covering portion 120 comprises three separate pieces of material, including two side pieces 122A and 122B and a spine 124 that extends from the forehead of the user, over the crown of the head, down the back of the head, and down the back of the neck of the user. Spine 124 is affixed (e.g., stitched) to the two side pieces 122 on both of its long edges to form head covering portion 120. In this case, as illustrated in FIG. 4E, the distance from the edge of spine 124 to the short edge of affixed nose covering portion 110, may be 1.75 inches or 4.445 centimeters.

Figure 5A:
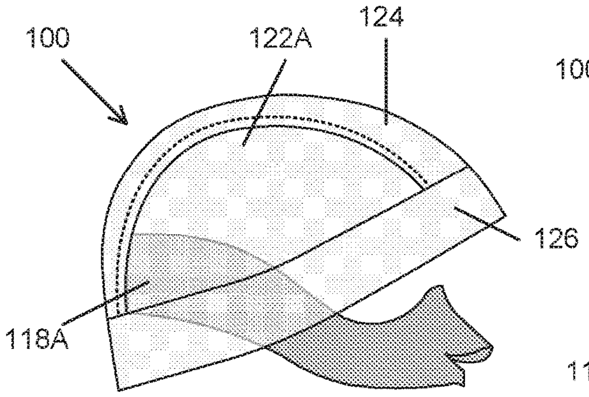
FIGS. 5A-5D illustrate various views of an example head garment, according to another embodiment.
Figure 5B:
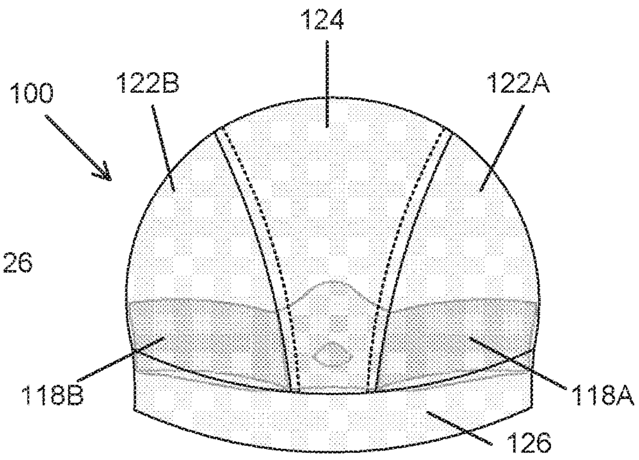
Figure 5C:
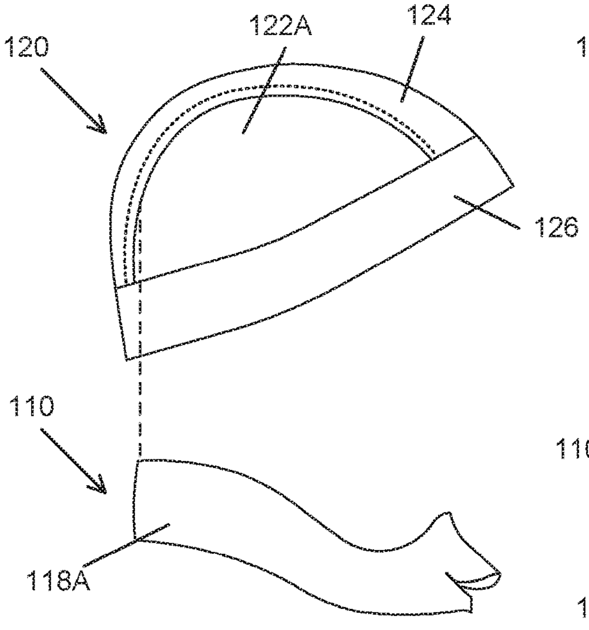
Figure 5D:
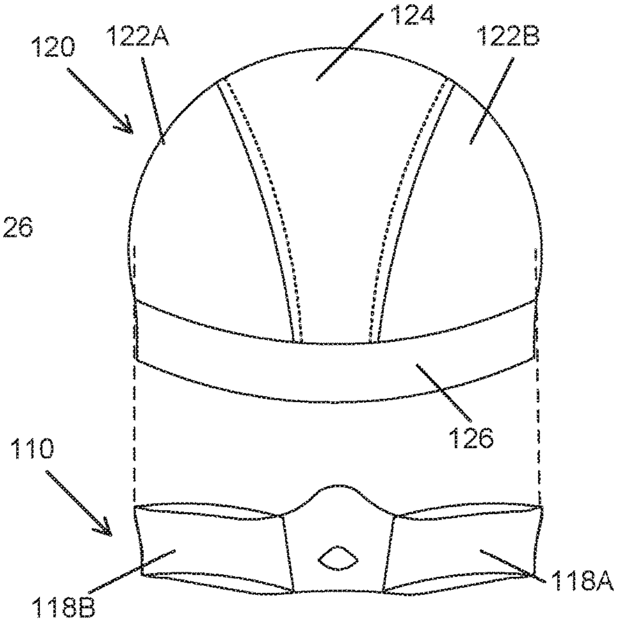

FIGS. 5A-5D illustrate various views of an example head garment 100, according to another embodiment. Specifically, FIG. 5A illustrates a side view, FIG. 5B illustrates a back view, FIG. 5C illustrates an exploded side view, and FIG. 5D illustrates an exploded back view. In this embodiment, head garment 100 comprises at least a nose covering portion 110 and a head covering portion 120. However, in this embodiment, head covering portion 120 comprises a skull cap. The skull cap may comprise two side pieces 122A and 122B, a spine 124, and a headband 126. The long edges of spine 124 are permanently affixed to respective side pieces 122, and the short edges of spine 124 are permanently affixed to opposing portions of headband 126. In addition, the other edges of side pieces 122 may be permanently affixed to headband 126. Thus, head covering portion is configured to cover a continuous portion of the user's head when worn, including the entire top of the user's head and down around at least a portion of the forehead and side and backs of the user's head.

In an embodiment, nose covering portion 110 is permanently or releasably affixed to the skull cap of head covering portion 120. For example, in the same or similar manner as discussed above, end portions 118 of nose covering portion 110 may be affixed to head covering portion 120 by positioning the exterior surface of end portions 118 so as to contact the interior surface of head covering portion 120, and stitching the surfaces together around at least a portion of the periphery of end portions 118. It should be understood that in an embodiment in which end portions 118 wrap around the back of the user's head when worn, the fixing means may be performed in the rear of the head covering portion 120 (e.g., at positions which will be on the back of the user's head when head garment 100 is worn). In any case, the stitching may be performed close to the short edges of end portions 118, so as to maximize the ability of nose covering portion 110 to stretch to accommodate different sizes and shapes of heads.

In practice, the head garment 100, illustrated in FIGS. 5A-5D, may be worn by positioning head covering portion 120 on the back of the user's head, and then pulling nose covering portion 110 over the face of the user. Nose covering portion 110 should be pulled so as to position nose bridge portion 112 over the bridge of the user's nose. The front of head covering portion 120 can also be pulled to position it over the user's forehead.

Figure 6A:
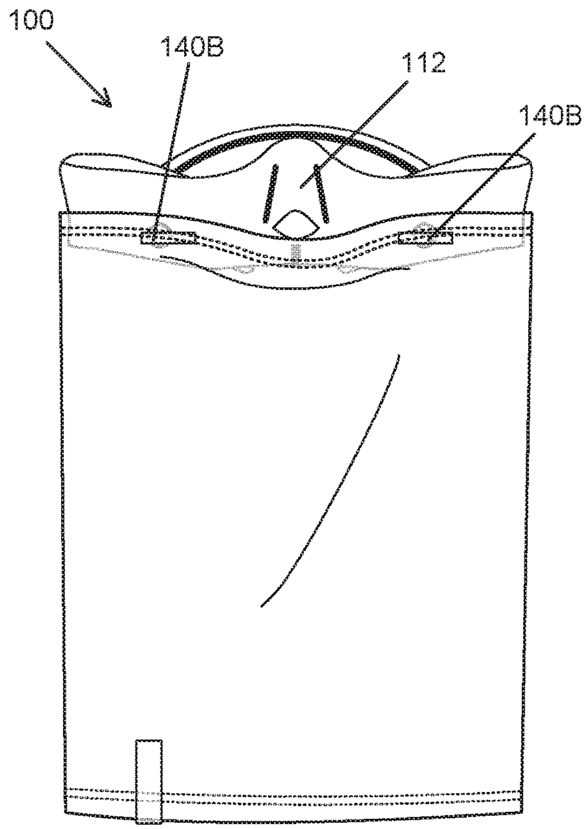
FIGS. 6A-6E illustrate various views of an example head garment, according to another embodiment.
Figure 6B:
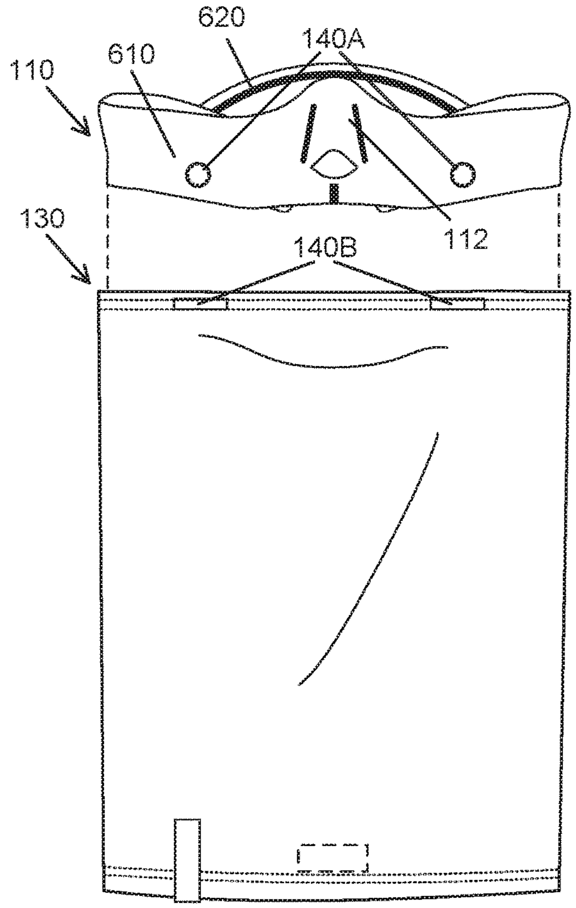
Figure 6D:
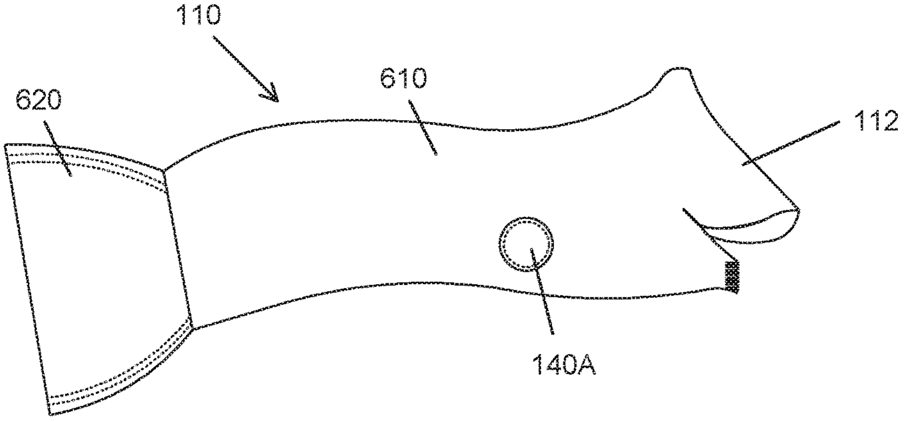
Figure 6E:
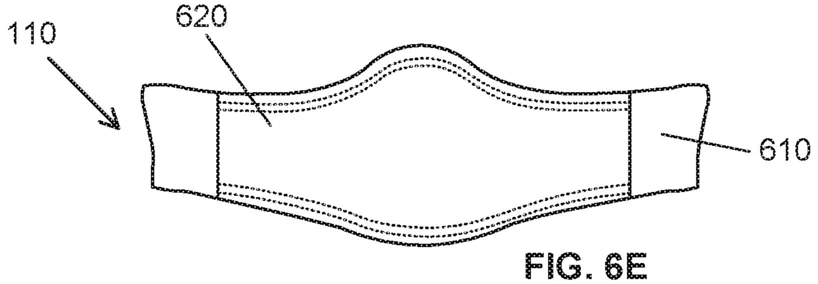
Figure 6C:
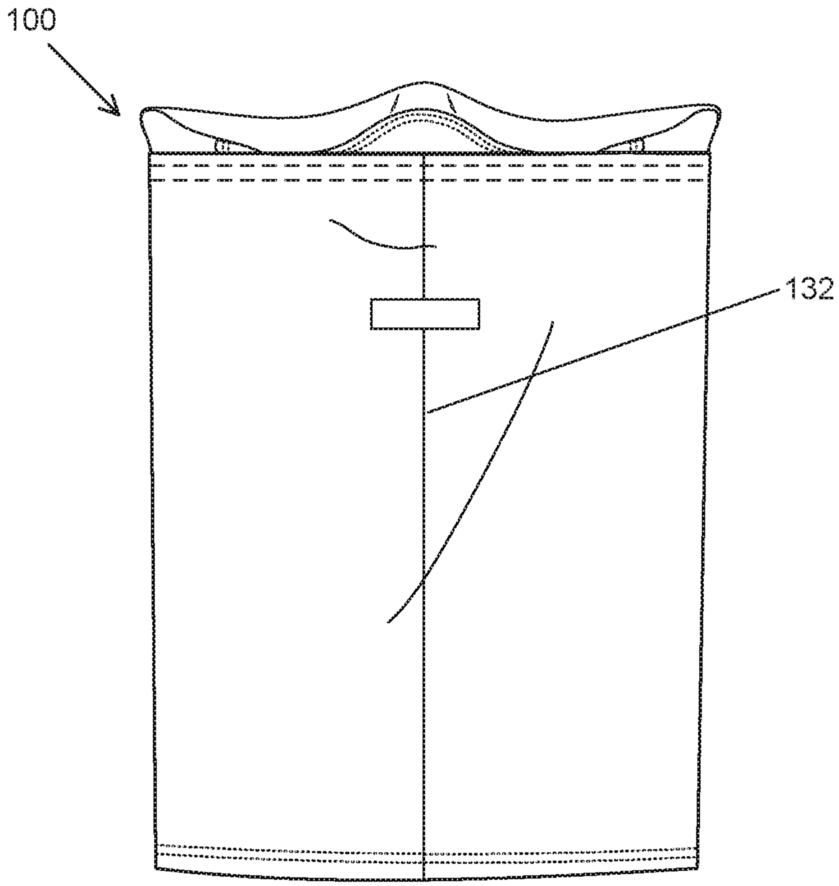

FIGS. 6A-6E illustrate various views of an example head garment 100, according to another embodiment. Specifically, FIG. 6A illustrates a front view, FIG. 6B illustrates an exploded front view, FIG. 6C illustrates a back view, FIG. 6D illustrates a side view of nose covering portion 110 in isolation, and FIG. 6E illustrates a back view of nose covering portion 110 in isolation. In this embodiment, head garment 100 comprises at least a nose covering portion 110 and a neck covering portion 130.

Nose covering portion 110 and neck covering portion 130 may be configured with fastener 140 to be releasably affixed to each other. For example, as discussed elsewhere herein, fastener 140 may comprise a fastener portion 140A (e.g., comprising two disk magnets), near a lower edge of nose covering portion 110, and a fastener portion 140B (e.g., comprising two bar magnets), near an upper edge of neck covering portion, and configured to magnetically engage with fastener portion 140A. Even though nose covering portion 110 and neck covering portion 130 can be releasably affixed along their front edges, in an embodiment, they are permanently affixed along at least a portion of their back and/or side edges. Thus, head garment 100 may transition between an open configuration in which a mouth opening is provided and a closed configuration in which no mouth opening is provided, as illustrated in a different embodiment in FIG. 3B, while head garment 100 remains a singular integrated unit. In an alternative embodiment, nose covering portion 110 and neck covering portion 130 may be two separable components that separate completely from each other when fastener portions 140A and 140B are disengaged from each other.

Neck covering portion 130 may be formed as a tube by wrapping a substantially rectangular piece of material into a substantially cylindrical shape, and then seaming or otherwise affixing opposing edges of the rectangle to each other (e.g., via stitching). For example, as illustrated in FIG. 6C, seam 132 may be positioned along the center line down the back of neck covering portion 120, when worn by a user.

Nose covering portion 110 may be formed from a front panel 610 and back panel 620. Front panel 610 may be similar to the nose covering portion 110 illustrated in FIGS. 1A-1C, with end portions that are affixed to back panel 620 Front panel 610 may be made from a material (e.g., NEOFLEECE®) that is the same as or different than the material from which back panel 620 is made. Nose covering portion 110 may be permanently affixed to neck covering portion 130 near the back top of the respective portions, in the relative positions shown in FIG. 6C. For example, the stitching may begin 5.5 inches from the center of the front of nose covering portion 110 along a longitudinal line extending around each side of nose covering portion 110. However, in an embodiment, nose covering portion 110 is not fully stitched to neck covering portion 130, to allow for some movement between the two, including movement at the front of both portions so that head garment 100 can transition between the open configuration (e.g., with a mouth opening 142) and closed configuration (e.g., without a mouth opening 142).

In practice, the head garment 100, illustrated in FIGS. 6A-6C, may be worn by pulling the tube of neck covering portion 130 and nose covering portion 110 over the head of the user. Nose covering portion 110 should be pulled so as to position nose bridge portion 112 over the bridge of the user's nose, and to position back panel 620 around the back of the user's head, over or proximate to the upper neck area or base of the head. While worn in the closed configuration, the user may pull on the front portion of either nose covering portion 110 and/or neck covering portion 130 to disengage their releasably affixed edges, thereby providing mouth opening 142. While worn in the open configuration, the user may pull the front portion of either nose covering portion 110 and/or neck covering portion 130 towards the corresponding edge of the other portion until fastener portions 140A and 140B engage each other to secure the edges to each other, thereby closing mouth opening 142.

Figure 7A:
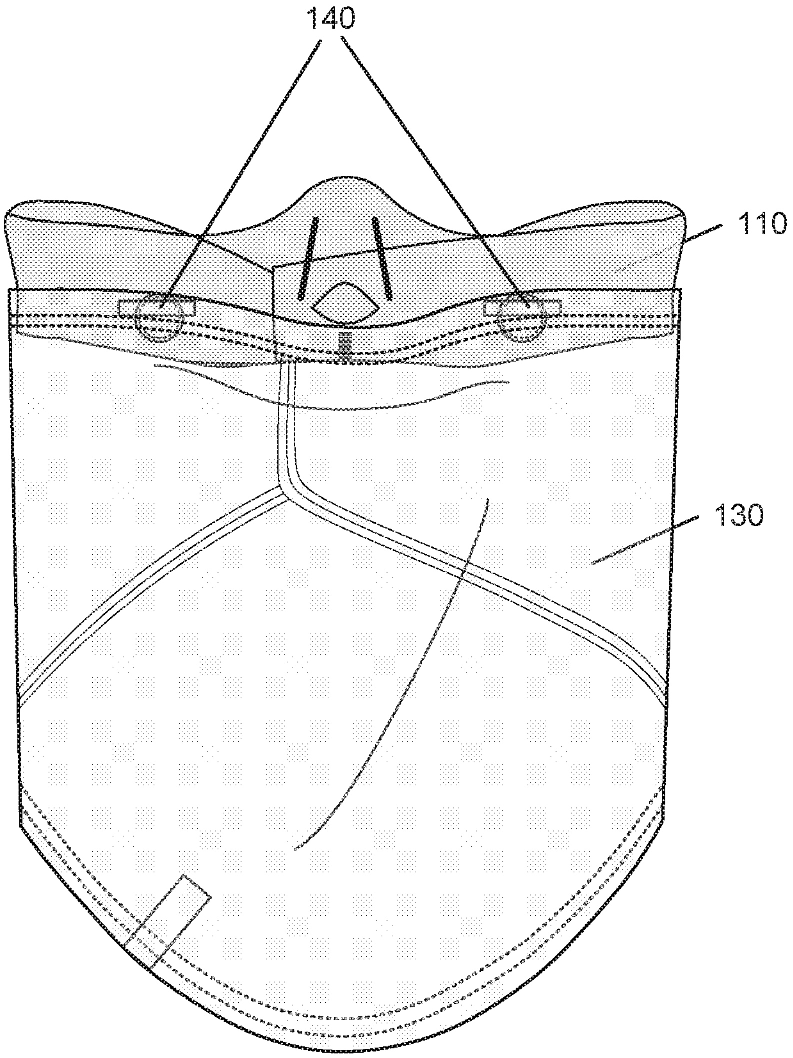
FIGS. 7A-7E illustrate various views of an example head garment, according to an embodiment.
Figure 7B:
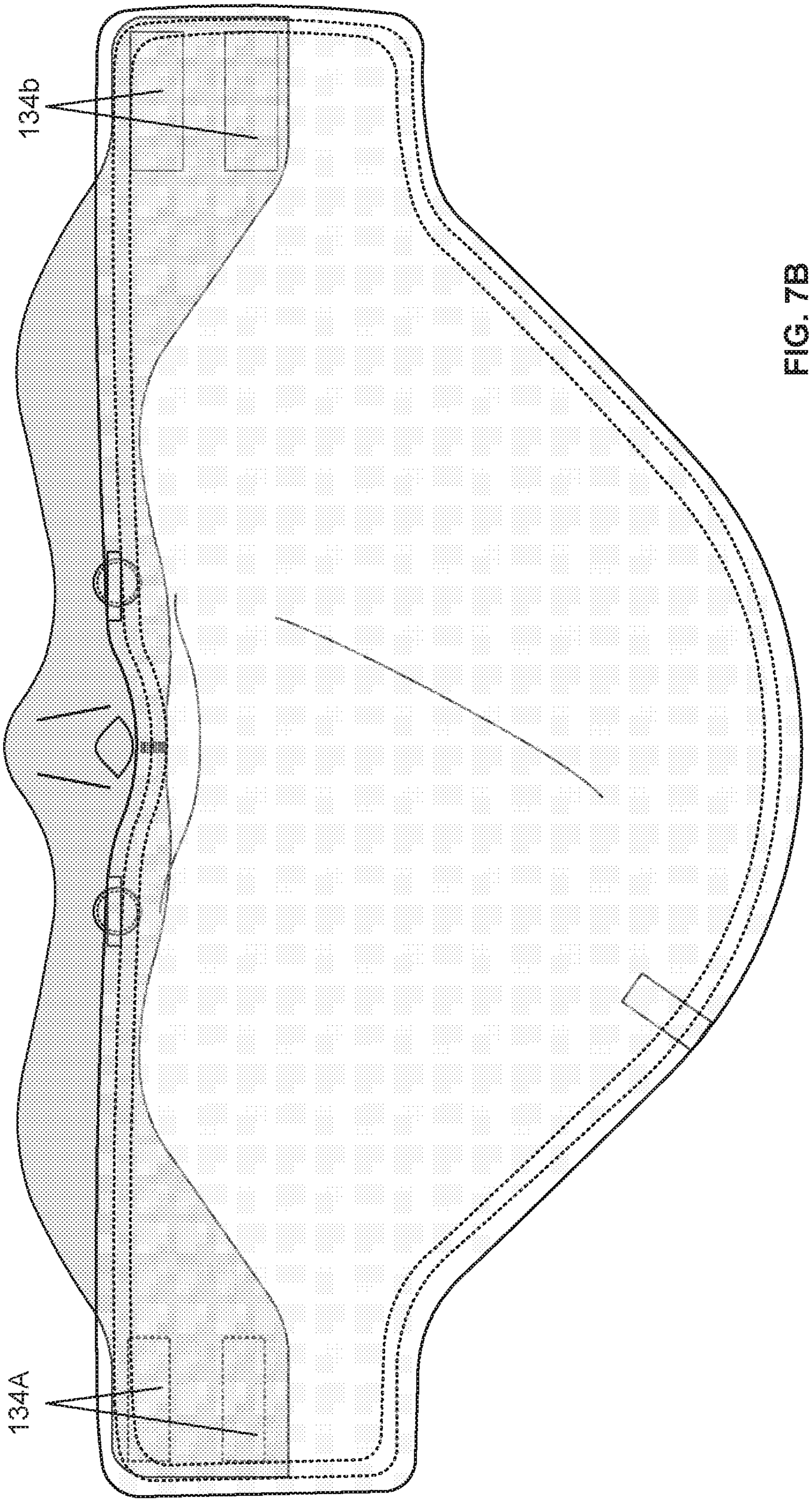
Figure 7C:
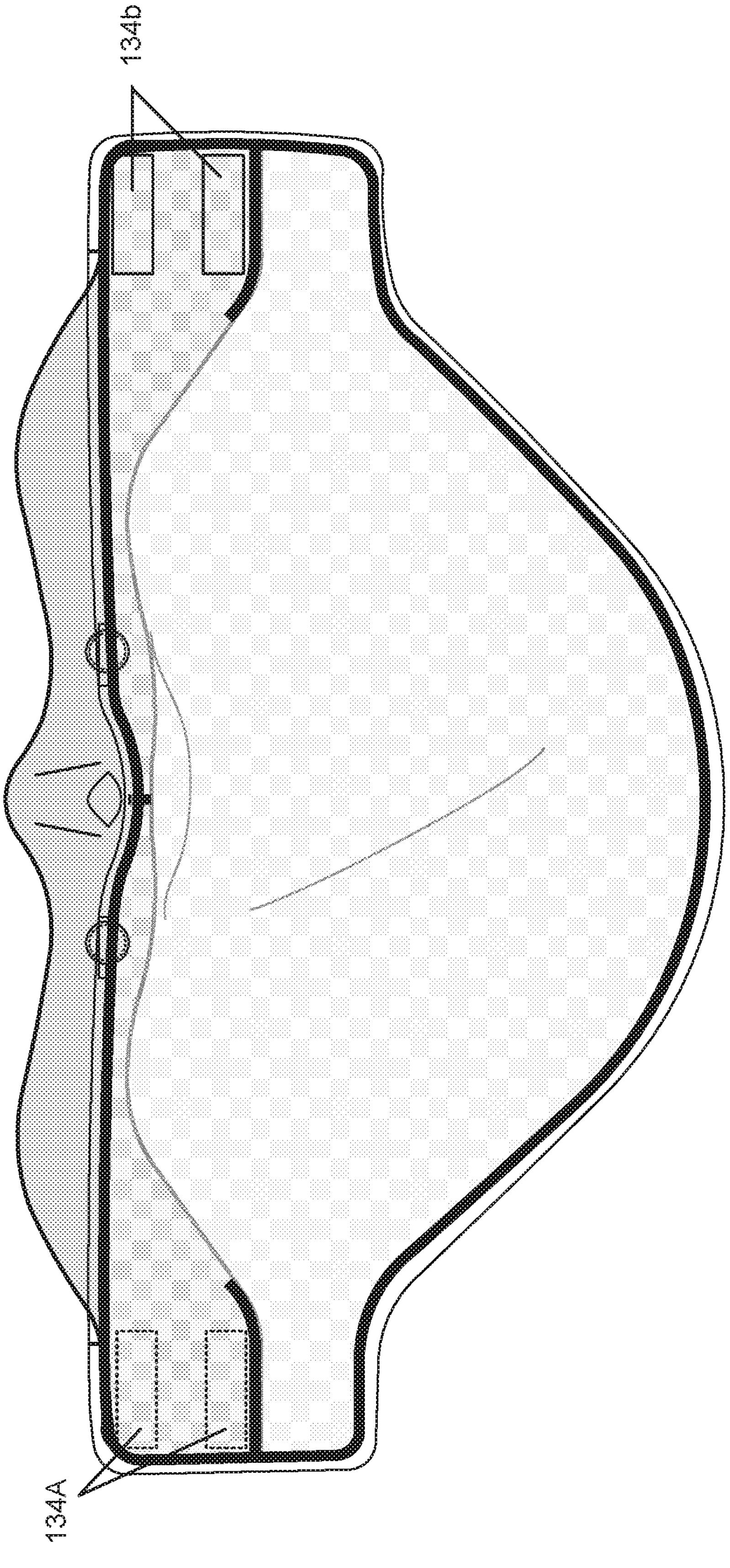
Figure 7D:
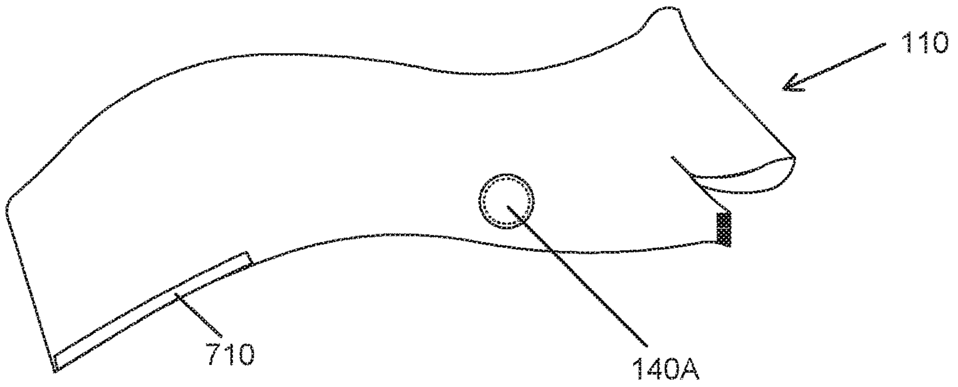
Figure 7E:
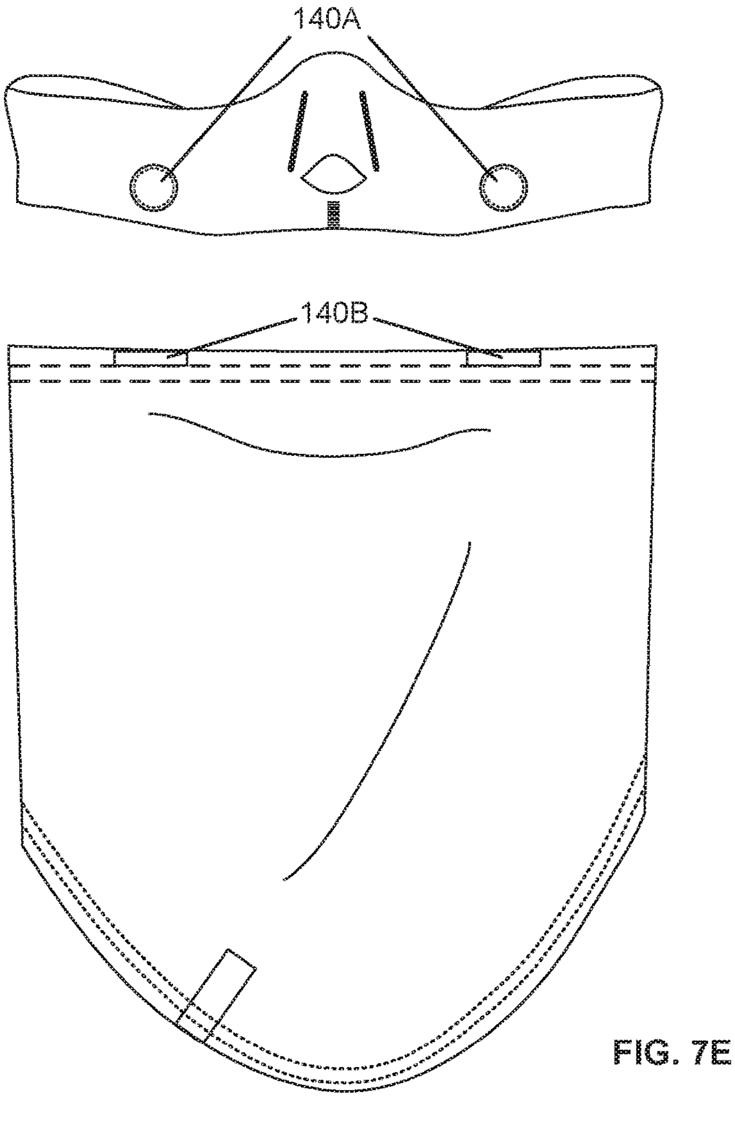

FIGS. 7A-7E illustrate various views of an example head garment 100, according to an embodiment. Specifically, FIG. 7A illustrates a front view of head garment 100 in a tubular configuration, FIG. 7B illustrates a front view of head garment 100 in a flat configuration, FIG. 7C illustrates a back view of head garment 100 in the flat configuration, FIG. 7D illustrates a side view of nose covering portion 110 in isolation, and FIG. 7E illustrates an exploded view of head garment 100 in the tubular configuration. This embodiment is similar to the embodiment illustrated in FIGS. 6A-6E. As in that embodiment, head garment 100 comprises a nose covering portion 110 and neck covering portion 130, and a fastener 140 that enables head garment 100 to transition between an open configuration, having a mouth opening 142, and a closed configuration, having no mouth opening 142. In addition, nose covering portion 110 may be affixed to neck covering portion 130 in the same manner as described above with respect to other embodiments. However, in this embodiment, neck covering portion 130 comprises a bandana that can transition between a tubular configuration and a flat configuration, so that it can be wrapped and unwrapped around the user's neck. This allows the user to put on and take off head garment 100 without having to pull it over the user's head.

In an embodiment, neck covering portion 130 comprises a bandana with a rounded bottom edge. Head garment 100 may comprise a fastener 134 that comprises a first fastener portion 134A and a second fastener portion 134B, which are configured to engage to each other and disengage from each other via manual force. Fastener 134 may comprise any fastening means described herein or well-known in the art. However, in the illustrated embodiment, fastener 134 comprises hooks and loops (e.g., VELCRO®). For instance, as illustrated in FIGS. 7B and 7C, fastener portion 134A may comprise two sets of loops on the back side of head garment 100 (e.g., on a back surface of nose covering portion 110), and fastener portion 134B may comprise two sets of hooks on the front side of head garment 100 (e.g., on a front surface of neck covering portion 130) that engage with the two sets of loops of fastener portion 134A. It should be understood that the hooks and loops may be switched between fastener portions 134A and 134B, and may consist of one or three or more sets of hooks and loops or other fastening means. However, it is generally advantageous to have at least two sets of the chosen fastening means in each of fastener portions 134A and 134B, to prevent the fastener portions 134A and 134B from rotating with respect to each other. As an example, each of the two sets of fastening means in fastener portions 134A and 134B may be vertically separated from each other by 1.5 centimeters. The top fastening means in each set may be rounded to follow the hem of head garment 100.

In practice, the head garment 100, illustrated in FIGS. 7A-7E, may be worn by wrapping head garment 100 around the user's face and engaging fastener portion 134A to fastener portion 134B at the back of the user's head. This secures head garment 100 around the user's head and neck in the tubular configuration illustrated in FIG. 7A. To remove head garment 100, the user simply needs to pull on the top flap of head garment 100, to disengage fastener portion 134A from fastener portion 134B. This allows head garment 100 to be unwrapped into the flat configuration illustrated in FIGS. 7B and 7C.

Nose covering portion 110 may be permanently affixed to neck covering portion 130 by hemming over the top and/or side edges of head garment 100 at the corners where nose covering portion 110 and neck covering portion 130 are in contact. It should be understood that the hem should not proceed across the entire area where nose covering portion 110 and neck covering portion 130 are in contact, since this would prevent the opening and closing of mouth opening 142 using fastener 140. In an embodiment, a hem is stitched around the edges of neck covering portion 130 to strengthen and support it. As illustrated in FIG. 7B, the hem may be ⅜ inches wide with a two-needle 3 millimeter cover stitch. In addition, as illustrated in FIG. 7D, the back bottom edge of nose covering portion 110 (e.g., the bottom edges of end portions 118) may be hemmed for addition strength and support. The hem may comprise a three-inch long four-thread overlock finish on each end portion 118.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A head garment comprising:

a head covering portion, wherein the head covering portion is positioned to, when the head garment is worn by a user, cover a forehead and a back of a head of the user;

a nose covering portion affixed to the head covering portion, the nose covering portion comprising a nose bridge portion, an upper lip portion below the nose bridge portion, and a through-hole between the nose bridge portion and the upper lip portion, wherein the nose covering portion is discrete from the head covering portion; and a neck covering portion comprising an upper edge and a first fastener portion in an upper region of the neck covering portion, wherein the nose bridge portion is positioned to, when the head garment is worn by the user, cover a bridge of a nose of the user, wherein the upper lip portion is positioned to, when the head garment is worn by the user, cover an upper lip of the user, wherein the through-hole is positioned to, when the head garment is worn by the user, provide a passageway between nostrils of the user and an external environment of the head garment, wherein the nose covering portion is a single piece of stretchable material fixed in at least a partial loop, such that, when the head garment is worn by the user, the nose covering portion is configured to at least partially encircle a bottom portion of a head of the user, with a portion that is configured to extend continuously from a first side of the back of the head, around a first side of the head, across a face of the user, around a second side of the head, and to a second side of the back of the head, wherein the nose covering portion further comprises a lower edge and a second fastener portion, wherein the first fastener portion and the second fastener portion are configured to engage to each other and disengage from each other via manual force, wherein, when the head garment is worn by the user, while the first fastener portion and the second fastener portion are engaged, the first fastener portion and the second fastener portion are positioned on a front of the head of the user, wherein the nose covering portion and the neck covering portion are permanently affixed to each other along at least a portion of the lower edge of the nose covering portion and the upper edge of the neck covering portion, and wherein, when the head garment is worn by the user, the nose covering portion is permanently affixed to the neck covering portion either on one or both of the first side or the second side of the head of the user, or behind the head of the user.

2. The head garment of claim 1, wherein the head covering portion comprises a passageway that, when the head garment is worn by the user, is positioned on the back of the head of the user, wherein the passageway is configured to be manually opened from a closed configuration and allow hair of the user to pass from an interior of the head garment to the external environment of the head garment.

3. The head garment of claim 1, wherein the nose covering portion comprises two end portions, wherein each end portion is configured to, when the head garment is worn by the user, wrap around a respective one of the first side and the second side of the head of the user, and wherein the nose covering portion is permanently affixed to an interior surface of the head covering portion.

4. The head garment of claim 3, wherein each end portion of the two end portions is configured to, when the head garment is worn by the user, wrap around to the back of the head of the user, and wherein, when the head garment is worn by the user, the nose covering portion is permanently affixed to the interior surface of the head covering portion behind the head of the user.

5. The head garment of claim 1, wherein, when the head garment is worn by the user:

when the first fastener portion and the second fastener portion are disengaged from each other, an opening is formed over a mouth of the user; and, when the first fastener portion and the second fastener portion are engaged to each other, the opening is closed such that the mouth of the user is covered by the neck covering portion.

6. The head garment of claim 1, wherein each of the first fastener portion and the second fastener portion comprises one or more magnets.

7. The head garment of claim 1, wherein each of the first fastener portion and the second fastener portion comprises two or more fastening components, and wherein each fastening component of the two or more fastening components of the first fastener portion is configured to engage with a corresponding fastening component of the two or more fastening components of the second fastener portion.

8. The head garment of claim 7, wherein the two or more fastening components of the second fastener portion comprises a first fastening component on a first side of the through-hole, and a second fastening component on a second side of the through-hole.

9. The head garment of claim 7, wherein each of the two or more fastening components of the first fastener portion comprises a bar magnet, and wherein each of the two or more fastening components of the second fastener portion comprises a disk magnet.

10. The head garment of claim 1, wherein the neck covering portion has a tubular shape.

* * * * *